United States Patent [19]

Defosse

[11] Patent Number: 4,568,471

[45] Date of Patent: Feb. 4, 1986

[54] FLUID LOSS ADDITIVE FOR CEMENT

[75] Inventor: Camille Defosse, St. Jean Bonnefonds, France

[73] Assignee: Etudes et Fabrication Dowell-Schlumberger, France

[21] Appl. No.: 566,199

[22] Filed: Dec. 28, 1983

[30] Foreign Application Priority Data

Jan. 28, 1983 [FR] France ................. 83 01369

[51] Int. Cl.$^4$ .................. C09K 7/02; C08L 33/02
[52] U.S. Cl. ................. 252/8.55 R; 252/8.5 A; 252/8.5 C; 526/287; 524/547
[58] Field of Search ............ 252/8.5 A, 8.5 C, 8.55 C, 252/8.55 R, 8.55 B; 166/307, 295, 271, 274, 308; 523/130; 524/5; 526/287

[56] References Cited

U.S. PATENT DOCUMENTS

| | | | |
|---|---|---|---|
| 3,927,717 | 12/1975 | Tate | 166/271 |
| 3,994,852 | 11/1976 | Adams et al. | 166/295 |
| 4,048,077 | 9/1977 | Engelhardt et al. | 252/8.5 C |
| 4,309,329 | 1/1982 | Lucas et al. | 252/8.5 C |
| 4,340,525 | 7/1982 | Hübner et al. | 252/8.55 B |
| 4,357,245 | 11/1982 | Engelhardt et al. | 252/8.5 C |

FOREIGN PATENT DOCUMENTS 2195644 6/1976 France .

*Primary Examiner*—Teddy S. Gron
*Assistant Examiner*—T. J. Wallen
*Attorney, Agent, or Firm*—Ostrolenk, Faber, Gerb & Soffen

[57] ABSTRACT

An aqueous solution of a terpolymer, useful as fluid loss agent for drilling muds and not for cement slurries, is treated with acid and heat. An excellent fluid loss agent for cement is obtained. Very efficient liquid additive, for all purposes, which does not modify either the rheology, nor substantially the setting time.

21 Claims, No Drawings

FLUID LOSS ADDITIVE FOR CEMENT

The present invention relates to cementing compositions, their use in cementing operations, in particular in cementing wells in underground formations.

More precisely, the present invention relates to additives for cementing compositions used in cementing oil and gas wells with a view to reducing fluid loss (FL) from the cement slurry towards surrounding underground formations.

Neat cement slurries containing only hydraulic cement and mix water are known to be subject to a high fluid loss rate when in contact with porous formations. In those cases, the use of a fluid loss controlling agent is required to limit the loss of interstitial slurry water into and through the formation porosity. Examples of the prior art describing the main chemical classes of fluid loss agents for cement compositions are U.S. Pat. Nos. 3,234,154, 3,483,007, 3,491,049 and 4,258,790.

The currently used fluid loss agents for cement compositions (designated by "FLAC") can be divided into two main different classes having substantially different characteristics. The first class consists of cellulose-base controlling agents, such as hydroxyethylcellulose or carboxymethylcellulose. They are solid and as a result difficult to handle in offshore operations. In addition, they tend to considerably increase the slurry viscosity, thereby preventing its movement under turbulent flow conditions. The second class comprises polymers such as polyethyleneimine and polyamines in general. They are liquid and give very thin slurries. Their main disadvantage is that they tend to be incompatible with most of the other additives for cement, such as dispersants and retarders, due to their cationic nature. There is thus at the moment an urgent need for an all purpose FLAC ideally combining the advantages of the two classes of known additives without presenting their respective drawbacks. In other words, an ideal FLAC should give thin FLACS, without raising however problems of compatibility. This additive should also be formulated in a liquid form.

The present invention proposes for the first time an improved FLAC presenting all these characteristics.

U.S. Pat. No. 4,048,077 describes terpolymers useful in the field of drilling muds.

U.S. Pat. No. 4,048,077 describes a class of terpolymers consisting of the following monomeric entities:

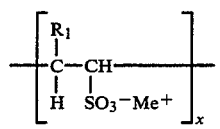

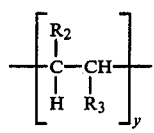

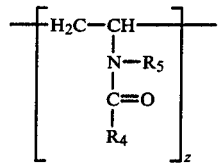

in which $R_1$ and $R_2$ represent H or $CH_3$, $R_3$ represents $CONH_2$, $CN$ or $COOCH_3$, $R_4$ represents H, $CH_3$ or $C_2H_5$, and $R_5$ represents $CH_3$ or $C_2H_5$, or $R_4$ and $R_5$ form together a propylene group forming with the NCO group a pyrrolidone radical, the $Me^+$ charge compensating cation being selected from $NH_4^+$, $K^+$, $Na^+$ or $Li^+$ and the parts by weight of the starting monomers, x, y and z for formulae I, II and III respectively, are respectively comprised between 5 and 50, 25 and 92 and 3 and 70.

This family of terpolymers described in U.S. Pat. No. 4,048,077 is useful as fluid loss agent for drilling muds, but is not suitable as fluid loss agent for cement compositions.

It has been discovered according to the invention that from this family of terpolymers a fluid loss agent for cement compositions could be obtained, if said terpolymers are treated in a relatively simple manner.

The treatment according to the invention consists in heat-treating at least one terpolymer in the form of aqueous solution in the presence of at least one acid. The original characteristic of the (acid and heat)-treated terpolymer (hereinafter "AHTT") thus obtained is that it permits fluid loss in cement slurries to be controlled, without presenting any of the conventional disadvantages of such additives such as for example appearance of a large quantity of free water and/or unacceptable deterioration of rheology.

Nothing in the state of the art suggested that such a treatment combining the action of heat and of an acid would make it possible to use the products obtained as FLACs.

The heat treatment is characterized by two parameters: its duration and the temperature at which it is carried out.

The influence of the duration and temperature of the heat treatment on the efficiency of AHTT as FLAC has been investigated. To this effect, the starting terpolymer powder (for all examples: product HOECHST "HOSTADRILL 2825") is dissolved in water, and 3.0N hydrochloric acid is added to obtain a final solution containing 20% by weight of dry polymer. The solution is then heated at 60 or 100° C. in a closed reactor for increasing periods of time. At the end of each period, a part of the solution is removed and is tested for efficiency as a FLAC.

The slurry is prepared and its fluid loss and free water characteristics are determined according to specifications API. 10. The rheological parameters i.e. plastic viscosity (PV) and yield value (YV) are similarly determined according to the same specifications by least square fitting on the FANN readings at 600, 300, 200 and 100 rpm., using the Bingham plastic model for describing the rheology of the cement slurry.

An adequate fluid loss control in a slurry cannot be obtained if the cement is not first totally dispersed into its individual elementary particles. This state of dispersion is easily obtained by applying a given mechanical shear stress (in the laboratory for example, using a WARRING blender) to the said slurry containing a dispersing agent, also called superplasticizer. The dispersant used for all tests reported in the present application is a product marketed by DOWELL SCHLUMBERGER under the name of TIC DS 80, which consists of the sodium salt of the condensation product of formaldehyde and sulfonated napthalene.

Table I hereinafter gives the results of tests conducted at 185° F. using fresh water, a tropical type DICKERHOFF class G cement, 0.2 gal/sk of DS 80 dispersant and 0.33 gal/sk of AHTT solution. Table 1 clearly shows that a control of the fluid loss in the slurry is not obtained if the terpolymer solution is only subjected to a heat treatment without acid, whatever the duration thereof. But if before heating, 1.5 millequivalents (mequ) HCl/g of dry polymer are added to the terpolymer solution, there is obtained after heating for 8 days at the moderate temperature of 140° F. an excellent fluid loss control. It is also noted that no free water has formed and that the rheological characteristic are excellent.

The skilled man knows that at a temperature of 185° F. a fluid loss value of about 300 indicates a negligible control of the fluid loss.

Table II gives more detailed results obtained with another cement, CEMOIL. The observations in Table I relative to fluid loss, free water and rheological characteristics are also applicable to Table II. More precisely, Table II shows that heating for a few hours (between 2 and 4) at 212° F. in the presence of an acid is sufficient to convert the starting terpolymer into a very efficient FLAC with remarkable properties. It is to be noted that the required quantity of AHTT is only about 0.65% by weight of cement, on a dry basis.

In practice, the heat treatment is carried out at between 140° F. and 392° F., preferably 212° F., for between 1 hour and 2 weeks, preferably between 4 to 7 hours at 212° F.

To determine the influence of the quantity and nature of the acid used for the treatment of the terpolymer solution, several solutions, all having the same final content (20% by weight of terpolymer) have been prepared. The acid used before the heat treatment is either HCl or $H_2SO_4$ and the concentration used for the test is between about 0.1 and 4.5 mequ/g of dry terpolymer. A proportion higher than 4.5 mequ/g of dry terpolymer may be used, but it will be necessary in most cases to neutralise the additive according to the invention thus obtained to prevent its acid nature from retarding setting of the cement. In the tests considered, the temperature and the duration of the heat treatment remained unchanged and were respectively 140° F. and 7 days. The test conditions for determining free water, fluid loss and rheology are as indicated above.

It is known from the state of the art that at 185° F. a fluid loss value of 100 is considered good. A value of 32 such as that obtained in the tests conducted on the additive according to the invention is exceptional, all the more so that it is accompanied by excellent rheological and free water characteristics.

Table III gives the results obtained with DYCKERHOFF cement and by varying the hydrochloric acid concentration. The efficiency of the AHTT solution as FLAC increases with the quantity of hydrochloric acid added, in the concentration range tested. Moreover, there is no formation of free water and the rheology of the slurry is virtually not affected, whatever the quantity of acid added.

In practice, about 0.10 to 5.0 mequ of acid/g of dry terpolymer may be used. The optimal value is about 1.5 mequ/g.

The results given in Table IV have been obtained using CEMOIL cement. All other conditions are the same as those of the preceding Table, except for the use of AHTT solutions treated with HCl on the one hand, or treated with $H_2SO_4$, on the other hand. In addition, in some cases, the acidity of the mix water resulting from the AHTT solution is post-neutralized at pH 7 before cement is added. The results obtained clearly show that post-neutralization does not affect the properties of the slurry and that hydrochloric acid proves to be more efficient in converting the starting terpolymer solution into an advantageous FLAC than $H_2SO_4$.

Typical slurry compositions have then been prepared which contain the AHTT solution according to the invention.

The conditions used for measuring the properties of the slurry are varied. In Table V, the temperature is kept to 185° F. but typical retarders are introduced in the slurry formulations, all other test conditions being as in Table III. The terpolymer solution treated at 140° F. with 1.5 mequ.HCl/g of dry terpolymer is used. The retarders are of the lignosulfonate or glucoheptonate type. The results show that the retarders do not substantially affect the properties of the slurry, whatever the type of retarder used. More particularly, the fluid loss control remains excellent due to the additive according to the invention, and the rheological characteristics are not affected.

Table VI gives the results obtained at 85° F. all other conditions being as described in Table V. The results of Table VI show that fluid loss can be kept to a low level if an additive concentration according to the invention as low as 0.08 gal/sk of cement, i.e. about 0.15 of dry terpolymer is used. In addition, free water is nonexistent and the rheological parameter are such that turbulent flow is easily obtained. In practice, about 0.5 to about 2% by weight of cement of AHTT (on a dry basis), and preferably about 0.1 to 1% may be used.

The use of the AHTT solution as FLAC has been extended to systems such as those prepared with sea water or salt water. Fluid loss control is known to be more difficult with this type of mix water than with fresh water. Fluid loss values of the order of 150 are, at the temperature considered, considered to be normal. The efficiency of the AHTT solution as FLAC for typical slurry formulations which are indicated in Table VII hereinafter together with the results obtained has been determined. For sea water systems, all the properties of the slurry, including fluid loss, are excellent at about 0.65% of dry terpolymer per cement weight. Concerning salt systems, a surprisingly good fluid loss control is obtained in the same AHTT concentration range, while the rheological characteristics are typical of the average values expected for such systems, in particular in case of saturated water (36% of NaCl).

Finally, the results given in Table VIII show that the AHTT solution has only a moderate retarding effect on the setting of cement, whether this solution is acid or post-neutralized.

Of course, the compositions containing the additive according to the invention may also contain other additives conventionally used in well cementing, such as retarders, accelerators, dispersants, antifoaming agents, diluents and the like.

In practice, the starting terpolymer solutions will contain about 5–40%, preferably 20% by weight of dry terpolymer.

TABLE I

Influence of duration and of temperature used for heat treating the 20% terpolymer solution on its efficiency as fluid loss agent for cement (FLAC). Tests conducted at 185° F. using fresh water (44% by weight of cement less liquid additive, 0.33 gal/sk of terpolymer solution per ton of cement and 0.2 gal/sk dispersant DS 80 per t of cement, according to API specifications 10. The cement used is tropical type DYCKERHOFF cement, Class G.

| | Heat Treatment | | Fluid | Free | | Rheology |
|---|---|---|---|---|---|---|
| HCl ++ | T (°F.) | Duration (Hours) | Loss (ml/30') | Water (ml/150 ml) | P.V. (cP) | Y.V. (lbs/100 sqft) |
| 0 | 212 | 1 | 239 | | | |
| | | 4 | 215 | | | |
| | | 8 | 206 | | | |
| 1.5 | 140 | 192 | 44 | 0 | 43 | 2.0 |
| | | 288 | 44 | — | — | — |
| | 212 + | 1 | 46 | 0 | 41 | 2.1 |

+treated additive used for 96 hours at 140° C.
++Quantity of HCl present in the terpolymer solution, in meq/g of dry terpolymer
P.V. Plastic viscosity
Y.V. Yield value

TABLE II

Influence of duration and of temperature used for heat treating the 20% terpolymer solution on its efficiency as fluid loss agent for cement (FLAC). Tests conducted at 185° F. using fresh water (44% by weight of cement less liquid additive, 0.33 gal/sk of terpolymer solution per ton of cement and 0.2 gal/sk of dispersant DS 80 per ton of cement, according to API specifications 10. The cement used is tropical type DYCKERKOFF cement, Class G.

| | Heat Treatment | | Fluid | Free | | Rheology |
|---|---|---|---|---|---|---|
| HCl ++ | T (°F.) | Duration (Hours) | Loss (ml/30") | Water (ml/150 ml) | P.V. (cP) | Y.V. (lbs/100 sq ft) |
| 0 | 212 | 0 | 353 | 0 | 30 | 2.8 |
| | | 1 | 335 | 0 | 31 | 2.6 |
| | | 4 | 282 | 0 | 32 | 2.7 |
| | | 8 | 313 | 0 | — | — |
| 1.5 | 140 | 0 | 353 | 0 | 30 | 2.8 |
| | | 24 | 228 | 0 | 33 | 1.5 |
| | | 96 | 158 | — | — | — |
| | | 120 | 106 | — | — | — |

TABLE II-continued

Influence of duration and of temperature used for heat treating the 20% terpolymer solution on its efficiency as fluid loss agent for cement (FLAC). Tests conducted at 185° F. using fresh water (44% by weight of cement less liquid additive, 0.33 gal/sk of terpolymer solution per ton of cement and 0.2 gal/sk of dispersant DS 80 per ton of cement, according to API specifications 10. The cement used is tropical type DYCKERKOFF cement, Class G.

| | Heat Treatment | | Fluid | Free | | Rheology |
|---|---|---|---|---|---|---|
| HCl ++ | T (°F.) | Duration (Hours) | Loss (ml/30") | Water (ml/150 ml) | P.V. (cP) | Y.V. (lbs/100 sq ft) |
| | | 192 | 74 | 0 | 45 | 2.3 |
| | | 288 | 32 | 0 | — | — |
| | 212 | 0 | 353 | — | — | — |
| | | 1 | 70 | 0 | 38 | 1.1 |
| | + | 4 | 50 | — | 39 | 0.1 |
| | | 8 | 36 | 0 | 41 | 1.5 |

+treated additive used for 96 hours at 60° C.
++Quantity of HCl present in the terpolymer solution, in meq/g of dry terpolymer
P.V. Plastic viscosity
Y.V. Yield value

TABLE III

Influence of quantity of acid added for the heat treatment of the efficiency as FLAC of the 20% terpolymer solution. The acid is HCl, the treatment is carried out at a temperature of 140° F. for 168 hours. Tests conducted at 185° F. using fresh water (44%) by weight of cement less liquid additives) and tropical type DYCKERHOFF cement, Class G, according to API specifications 10.

| | Concentration used | | | | | |
|---|---|---|---|---|---|---|
| | Terpolymer | | | Free | Rheology | |
| Acid + | 20% Solution (gal/sk) | DS 80 (gal/sk) | Fluid Loss (ml/30') | Water (ml/150 ml) | P.V. (cP) | Y.V. (lbs/100 sqft) |
| 0.08 | 0.165 | 0.10 | 231 | 1 | | |
| 0.61 | 0.165 | 0.10 | 140 | 1 | 22 | 0.1 |
| | 0.33 | 0.125 | 52 | 1 | | |
| | 0.50 | 0.10 | 68 | 1 | | |
| 1.06 | 0.33 | 0.125 | 62 | 0 | 37 | 1.4 |
| 1.21 | 0.33 | 0.125 | 56 | | | |
| 1.50 | 0.165 | 0.10 | 110 | 0.5 | 23 | 0 |
| | 0.33 | 0.125 | 55 | 1 | | |
| | 0.50 | 0.10 | 46 | 0 | | |
| 4.55 | 0.165 | 0.10 | 78 | 1 | 24 | 1.3 |
| | 0.50 | 0.10 | 32 | 0 | | |

+Quantity of HCl present in the terpolymer solution in meq/g of dry terpolymer.

TABLE IV

Influence of the nature of the acid used and of postneutralization of the terpolymer solution on its efficiency as FLAC. The heat treatment is carried out at a temperature of 140° F. and for 168 hours. Tests conducted at 185° F. using fresh water (44% by weight of cement less liquid additives) and CEMOIL cement, Glass G, according to specifications API 10.

| Concentrations used | | | | | | Rheology | | |
|---|---|---|---|---|---|---|---|---|
| DS80 gal/sk | Terpolymer 20% Solution gal/sk | Acid Nature | Amount + | Fluid Loss ml/30" | Free Water ml/150 ml | P.V. cP | Y.V. lbs.100 sq ft | (1) ++ |
| 0.2 | 0.165 | HCl | 0.61 | 231 | 0 | 23 | 4.9 | No |
| | | | 1.50 | 155 | 0 | 23 | 2.6 | No |
| | | | 1.50 | 185 | 0 | | | Yes |
| | | H2SO4 | 0.61 | 205 | 0 | | | No |
| | | | 1.50 | 198 | 0 | | | No |
| 0.2 | 0.33 | HCl | 0.61 | 250 | 0.5 | 28 | 2.0 | No |
| | | | 1.50 | 68 | 0 | 33 | 2.7 | No |
| | | | 1.50 | 68 | 0 | 48 | 4.1 | Yes |
| | | H2SO4 | 0.61 | 224 | 0 | | | No |
| | | | 1.50 | 153 | 0 | | | No |
| | | | 1.50 | 149 | 0 | | | Yes |
| 0.3 | 0.33 | HCl | 0.61 | 74 | 0 | 33 | 3.8 | No |
| | | | 1.50 | 24 | 0 | 40 | 3.8 | No |
| | | H2SO4 | 0.61 | 150 | 0 | 36 | 2.8 | No |

TABLE IV-continued

Influence of the nature of the acid used and of postneutralization
of the terpolymer solution on its efficiency as FLAC.
The heat treatment is carried out at a temperature of 140° F. and for 168 hours.
Tests conducted at 185° F. using fresh water (44% by weight of cement
less liquid additives) and CEMOIL cement, Glass G, according to
specifications API 10.

| Concentrations used | | | | | | | |
|---|---|---|---|---|---|---|---|
| DS80 gal/sk | Terpolymer 20% Solution gal/sk | Acid Nature + | Acid Amount + | Fluid Loss ml/30" | Free Water ml/150 ml | Rheology P.V. cP | Rheology Y.V. lbs.100 sq ft | (1) ++ |
| | | | 1.50 | 134 | 0 | 33 | 4.3 | No |

++"yes" indicates that a postneutralization has carried out, i.e. the PH of the 20% terpolymer solution has been brought to 7 after the heat-treatment in the presence of acid.
(1) post-neutralization.

TABLE V

Typical slurry compositions containing retarders. All test conditions are as in Table II. The heat-treatment of the 20% terpolymer solution is carried out at 140° F. for 168 hours with 1.5 meq HCl/g of dry terpolymer.

| DS80 gal/sk | Terpolymer 20% Solution gal/sk | Retarder Type + | Retarder Concentration gal/sk | Fluid Loss ml/30" | Free Water ml/150 ml | Rheology P.V. cP | Rheology Y.V. lbs/100 sqft |
|---|---|---|---|---|---|---|---|
| 0.10 | 0.165 | None | 0 | 94 | 0.5 | 28 | 2.8 |
| | 0.33 | None | 0 | 40 | 0 | 46 | 5.0 |
| 0.15 | 0.25 | None | 0 | 54 | 0 | 36 | 1.8 |
| 0.15 | 0.25 | L | 0.05 | 56 | 2 | 45 | 5.0 |
| | | G | 0.05 | 96 | 2 | 32 | 0.8 |

+L = Retarder of the lignosulfonate type
G = Retarder of the glucoheptonate type

TABLE VI

Typical slurry compositions
All test conditions are
as indicated in Tables II and V except for temperature
for testing the slurry = 85° F.

| DS 80 (gal/sk) | Terpolymer 20% Solution (gal/sk) | Fluid Loss (ml/30') | Free Water (ml/150 ml) | Rheology P.V. (cP) | Rheology Y.V. (lbs/100 sqft) |
|---|---|---|---|---|---|
| 0.1 | 0.08 | 192 | 0 | 30 | 3.4 |
| | 0.165 | 80 | 0 | 41 | 5.0 |
| 0.2 | 0.08 | 32 | 0 | 27 | 0.0 |
| | 0.165 | 34 | 1.5 | 69 | 1.2 |
| 0.15 | 0.125 | 54 | 0 | 36 | 1.4 |

TABLE VII

Test conducted at 185° F. using various salt systems as mix water.
The 20% terpolymer solution is treated at 140° F. for 288 hours in
the presence of 1.5 meq HCl/g of dry terpolymer.
Density of all slurries : 1.80 g/cm³.

| Cement Brand | Mix Water % BWOC | Salt Content of mix water % BWOW | Terepolymer DS80 gal/sk | Terepolymer solution gal/sk | FL ml/30" | FW ml/150 ml | Rheology P.V. cP | Rheology Y.V. (+) |
|---|---|---|---|---|---|---|---|---|
| CEMOIL CLASS G | 46.5 | SW | 0.2 | 0.33 | 68 | 0 | 35 | 3.6 |
| | 50.5 | NaCl;18 | 0.2 | 0.33 | 116 | 0 | 47 | 5.3 |
| | 56.6 | NaCl;36 | 0 | 0.175 | 58 | 0 | 58 | 31.3 |
| DYCKER HOFF CLASSG | 46.5 | SW | 0.2 | 0.33 | 52 | 2 | 33 | 0.0 |

SW = Salt water prepared according to Norm ASTM No. D 1141-75
% (1) = % by weight of cement
% (2) = by weight of water
(+) lbs/100 sqft

TABLE VIII

Thickening time of slurries prepared with CEMOIL class G cement, fresh water and 0.2 gal/sk of dispersant DS 80 per ton of cement. The 20% terpolymer solution is treated at 140° F. for 168 hours in the presence of 1.5 meq HCl/g of dry terpolymer. Schedule used is 7 g 5 of the API specifications 10.

| Terpolymer Solution | Post-neutralization + | Thickening Time (hours:minutes) |
|---|---|---|
| 0 | — | 1:30 |
| 0.33 | No | 2:30 |
| 0.33 | Yes | 2:10 |

+ see note (++) of TABLE IV.

What I claim is:

1. A fluid loss additive for cement compositions wherein said additive comprises the product obtained from the heat treatment of at least one hour at 140° F. or greater in the presence of at least one acid of an aqueous solution containing at least one terpolymer constituted by the following monomeric entities:

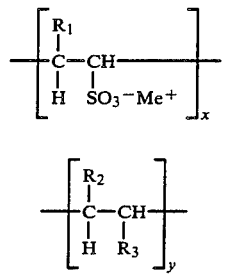

-continued

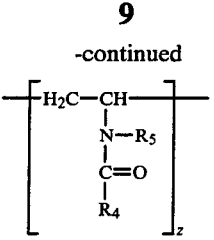

in which $R_1$ and $R_2$ represent H or $CH_3$, $R_3$ represents $CONH_2$, CN or $COOCH_3$, $R_4$ represents H, $CH_3$ or $C_2H_5$, and $R_5$ represents $CH_3$ or $C_2H_5$, or $R_4$ and $R_5$ form together a propylene group forming with the NCO group a pyrrolidone radical, the $Me^+$ charge compensating cation being selected from $NH_4^+$, $K^+$, $Na^+$ or $Li^+$ and the parts by weight of the starting monomers, x, y and z for formulae I, II and III respectively, respectively comprise between 5 and 50, 25 and 92 and 3 and 70.

2. An additive as claimed in claim 1, wherein the acid is hydrochloric acid.

3. An additive as claimed in claim 1, wherein the acid is sulfuric acid.

4. An additive as claimed in any one of claims 1, 2 or 3, wherein the treating acid is used in a proportion of about 0.10 to about 5.0 mequ/g of dry terpolymer.

5. An additive as claimed in claim 4, wherein the proportion of the treating acid is about 1.5 mequ/g of dry terpolymer.

6. An additive as claimed in claim 1, wherein the duration and temperature of the heat treatment are between 1 hour and 2 weeks and between 140° and 392° F. respectively.

7. An additive as claimed in claim 6 wherein the duration and temperature of the heat treatment are between 4 and 8 hours and 212° F., respectively.

8. An additive as claimed in claim 1, wherein the starting terpolymer is used in the form of an aqueous solution of 5–40 % by weight of dry terpolymer.

9. An additive as claimed in claim 8 wherein the starting terpolymer is used in the form of an aqueous solution of about 20% by weight of dry terpolymer.

10. An additive as claimed in claim 9 in which the acid is HCl or $H_2SO_4$.

11. An additive as claimed in claim 1, wherein said additive is further post-neutralized at pH 7.

12. Cement slurry composition for cementing wells, in particular oil and gas wells, wherein said composition contains cement and an additive as claimed in claim 1.

13. Composition as claimed in claim 12, wherein the proportion of additive used corresponds to a proportion of about 0.05 to about 2% by weight of cement, of dry additive.

14. Composition as claimed in claim 13 wherein the proportion of additive used corresponds to a proportion of about 0.10 to 1% by weight of cement of dry additive.

15. A process for the preparation of an additive comprising a terpolymer constituted by the following monomeric entities:

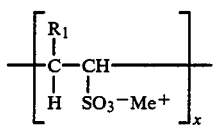

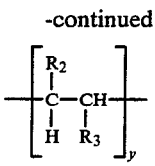

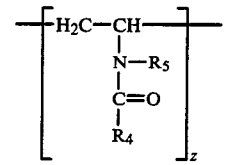

in which $R_1$ and $R_2$ represent H or $CH_3$, $R_3$ represents $CONH_2$, CN or $COOCH_3$, $R_4$ represents H, $CH_3$ or $C_2H_5$, and $R_5$ represents $CH_3$ or $C_2H_5$, or $R_4$ and $R_5$ form together a propylene group forming with the NCO group a pyrrolidone radical, the $Me^+$ charge compensating cation being selected from $NH_4^+$, $K^+$, $Na^+$ or $Li^+$ and the parts by weight of the starting monomers, x, y and z of formulae I, II and III, respectively, are respectively comprised between 5 and 50, 25 and 92, and 3 and 70, wherein an aqueous solution of about 5–40% dry weight, of at least one said terpolymer is heated in the presence of an acid for at least one hour at 140° F. or greater.

16. A process as claimed in claim 15, wherein the duration and temperature of the heat treatment are between 1 hour and 2 weeks and between 140° and 392° F. respectively.

17. A process as claimed in claim 16 in which the duration and temperature of the heat treatment is between 4 and 8 hours and 212° F., respectively.

18. A process as claimed in claim 15 wherein the aqueous solution contains about 20% dry weight of terpolymer.

19. A process as claimed in claim 15 in which the acid is HCl or $H_2SO_4$.

20. In a process for cementing the annulus of an oil or gas well the improvement which comprises injecting into the well a cementing composition containing an additive comprising the product obtained from the heat treatment in the presence of at least one acid of an aqueous solution containing at least one terpolymer constituted by the following monomeric entities:

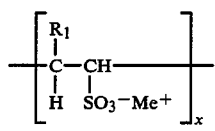

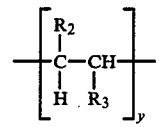

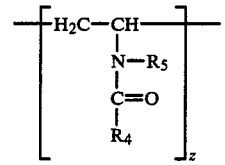

in which $R_1$ and $R_2$ represent H or $CH_3$, $R_3$ represents $CONH_2$, CN or $COOCH_3$, $R_4$ represents H, $CH_3$ or $C_2H_5$, and $R_5$ represents $CH_3$ or $C_2H_5$, or $R_4$ and $R_5$ form together a propylene group forming with the NCO group a pyrrolidone radical, the $Me^+$ charge compensating cation being selected from $NH_4^+$, $K^+$, $Na^+$ or $Li^+$ and the parts by weight of the starting monomers, x, y and z of formulae I, II and III, respectively, are respectively comprised between 5 and 50, 25 and 92, and 3 and 70.

21. The process of claim 20, wherein the proportion of additive used corresponds to a proportion of about 0.05 to about 2% by weight of cement, of dry additive.

* * * * *

UNITED STATES PATENT AND TRADEMARK OFFICE
CERTIFICATE OF CORRECTION

PATENT NO. : 4,568,471
DATED : February 4, 1986
INVENTOR(S) : Camille Defosse

It is certified that error appears in the above-identified patent and that said Letters Patent are hereby corrected as shown below:

Delete "(FL)" from column 1, line 10
Delete "FLAC" from column 1, lines 25, 41, 44 and 50 and
    replace with --Agent--
Delete "FLACS" from column 1, line 45 and replace with
    --Agents--
Delete "FLACs" from column 2, line 42 and replace with
    --Agents--
Delete "FLAC" and replace with --Agent-- at the following
    locations in the patent:

column 2, line 47 and 56;
    column 3, lines 34 and 66;
    column 4, lines 17, 45 and 51;
    the third line of Table I, column 5;
    the third line of Table II, column 5;
    the third line of Table II, column 6;
    the second line of Table III, column 6;
    the second line of Table IV, column 6; and
    the second line of Table IV, column 7.

Signed and Sealed this

Fourteenth Day of October, 1986

[SEAL]

*Attest:*

DONALD J. QUIGG

*Attesting Officer*      *Commissioner of Patents and Trademarks*